Oct. 28, 1930.  J. VOLCKHAUSEN  1,779,573
TIRE VALVE INSIDES
Filed Nov. 28, 1924

INVENTOR:
Julius Volckhausen,
By Attorneys.
Fraser, Myers & Manley

Patented Oct. 28, 1930

1,779,573

UNITED STATES PATENT OFFICE

JULIUS VOLCKHAUSEN, OF WEEHAWKEN, NEW JERSEY, ASSIGNOR TO A. SCHRADER'S SON, INC., OF BROOKLYN, NEW YORK, A CORPORATION OF NEW YORK

TIRE-VALVE INSIDES

Application filed November 28, 1924. Serial No. 752,614.

The present invention relates to tire valve insides and more particularly to the valve spring and spring cup thereof, and aims to provide certain improvements therein.

The present day tire valve insides, which are mostly all of the top repair type, have their various parts non-separably mounted upon the valve pin, so that the valve insides can be inserted and removed from a valve casing as a unit. They are usually provided with a valve spring and a separately formed spring cup which serves the dual purpose of providing a support for the spring and a means for preventing the removal of the spring from the valve pin. This type of valve insides has proved very practicable. Hence, the present invention does not contemplate changing the operative relation of the parts but rather seeks to reduce the manufacturing cost of such devices.

To this end, the present invention consists in forming the spring and spring cup integrally, and preferably from a single piece of wire, and thereby wholly avoid the separate forming and assembling operation incident to the use of the present type of spring cup. The invention also includes other features of improvement which will be hereinafter more fully described.

In the accompanying drawings, which show two embodiments of my invention,—

Figure 1:
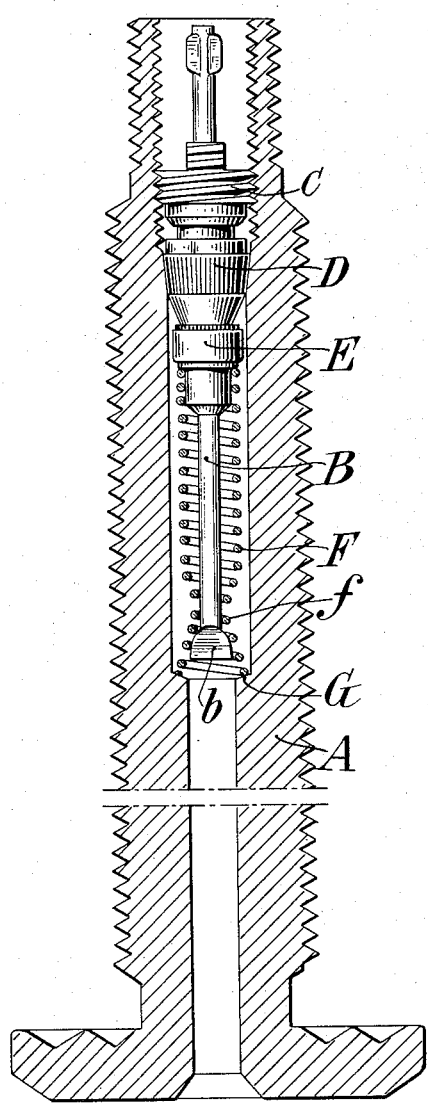
Figure 1 is a longitudinal section of a tire valve, showing the invention applied to the valve insides therein.
Figure 2:
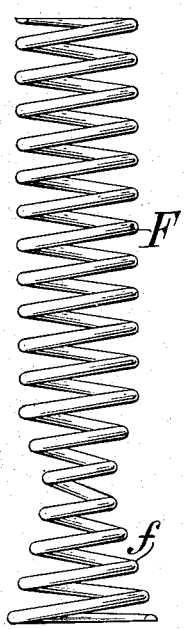
Fig. 2 is an elevation of the combined spring and spring cup.

Referring first to Figs. 1 and 2, of the drawings, let A indicate a tire valve casing of conventional design having therein a valve inside consisting of a valve pin B, having non-separably mounted thereon a valve plug C, a valve seat D, a valve proper E and a valve spring F.

The foregoing parts are all of conventional form with the exception of the valve spring F, which has its lower end voluted in the form of a cone, as shown at $f$, the apex of the cone being located intermediate the bearing ends of the spring. This conical portion $f$ serves the dual function of providing a support for the spring F upon the shoulder G within the valve casing and also means for preventing the removal of the spring from the valve pin after being assembled thereon and the end of the valve pin swaged or flattened, as shown at $b$. It will thus be seen that the portion $f$ of the spring accomplishes the same functions as does the conventional separately formed spring support.

Figure 3:
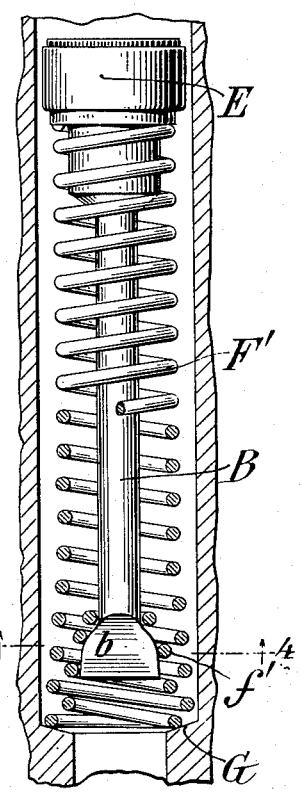
Fig. 3 is a partial longitudinal section of a tire valve, showing a modification of the combined spring and spring cup.
Figure 4:
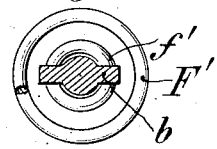
Fig. 4 is a transverse section taken on the line 4—4 of Fig. 3.

In the modification of the spring F' and spring cup shown in Fig. 3, the opposite bearing ends of the spring are seated against the valve check E and the shoulder G within the valve casing respectively, and the voluted conical portion $f'$ has its apex intermediate the bearing ends of the spring and engages over the projection $b$ formed by swaging the lower end of the valve pin.

In each of the modifications disclosed, it will be seen that the spring has three bearing parts, namely, the upper end which is adapted to bear against the valve check, the lower bearing part which is adapted to seat against the shoulder G within the valve casing, and the bearing at the apex of the conical portion of the spring adapted to bear against a projection $b$ on the valve pin.

A combined valve spring and cup as thus constituted can be very economically produced, and results in a substantial saving in the manufacturing cost of valve insides, in that it does away with the separate stamping and assembling operation of the present day spring cup.

While I have shown two embodiments of my invention, it will be understood that I do not wish to be limited to the specific disclosure, since various modifications may be resorted to without departing from the spirit of the invention.

What I claim is:—

1. A spiral spring having a portion adjacent one of its bearing ends voluted in the form of a cone which reenters said bearing end.

2. A spiral spring having convolutions of different sizes, the smallest of which is intermediate the bearing ends of the spring, and is formed at the end of the wire from which the spring is made.

3. In combination, a pin having two spaced abutments thereon and a spiral spring mounted on and encircling said pin and having one end bearing against one of said abutments, said spring having convolutions of different sizes, the smallest of which is intermediate the bearing ends of the spring and cooperates with the second abutment on the pin to nondetachably hold the spring on said pin.

In witness whereof, I have hereunto signed my name.

JULIUS VOLCKHAUSEN.